May 17, 1966 F. M. EVENS ETAL 3,251,217
DETERMINATION OF GASES IN METALS
Filed March 5, 1963 3 Sheets-Sheet 1
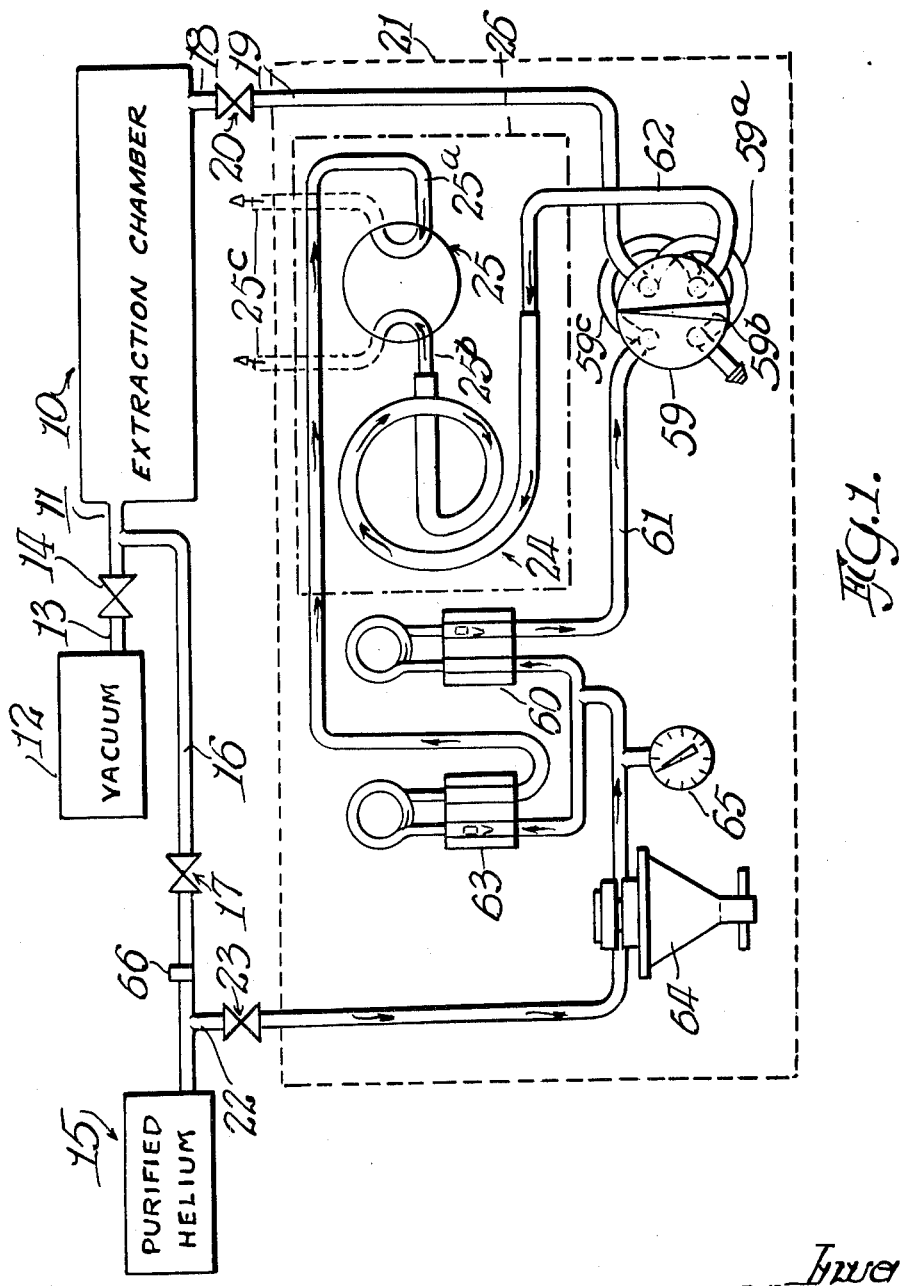

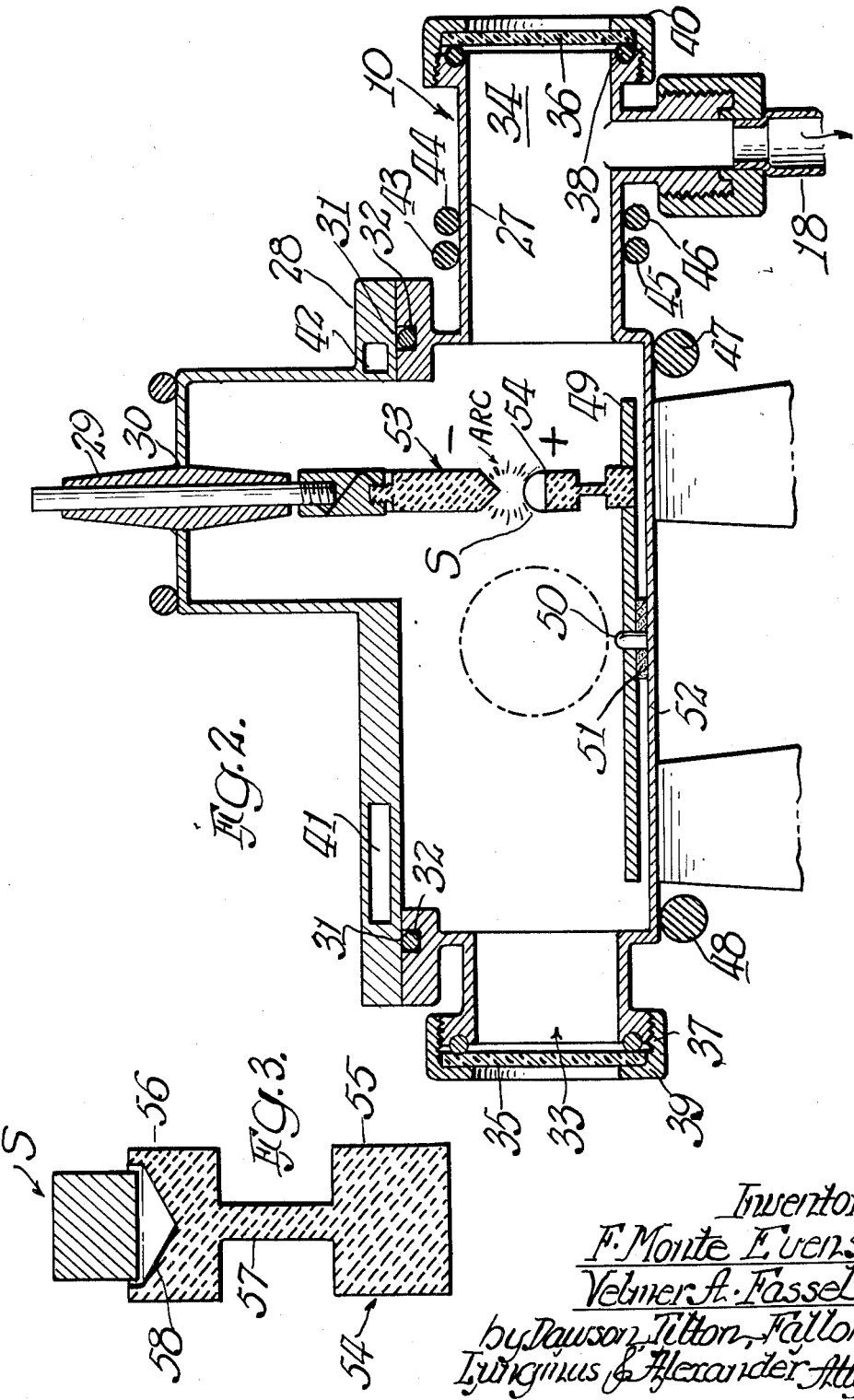

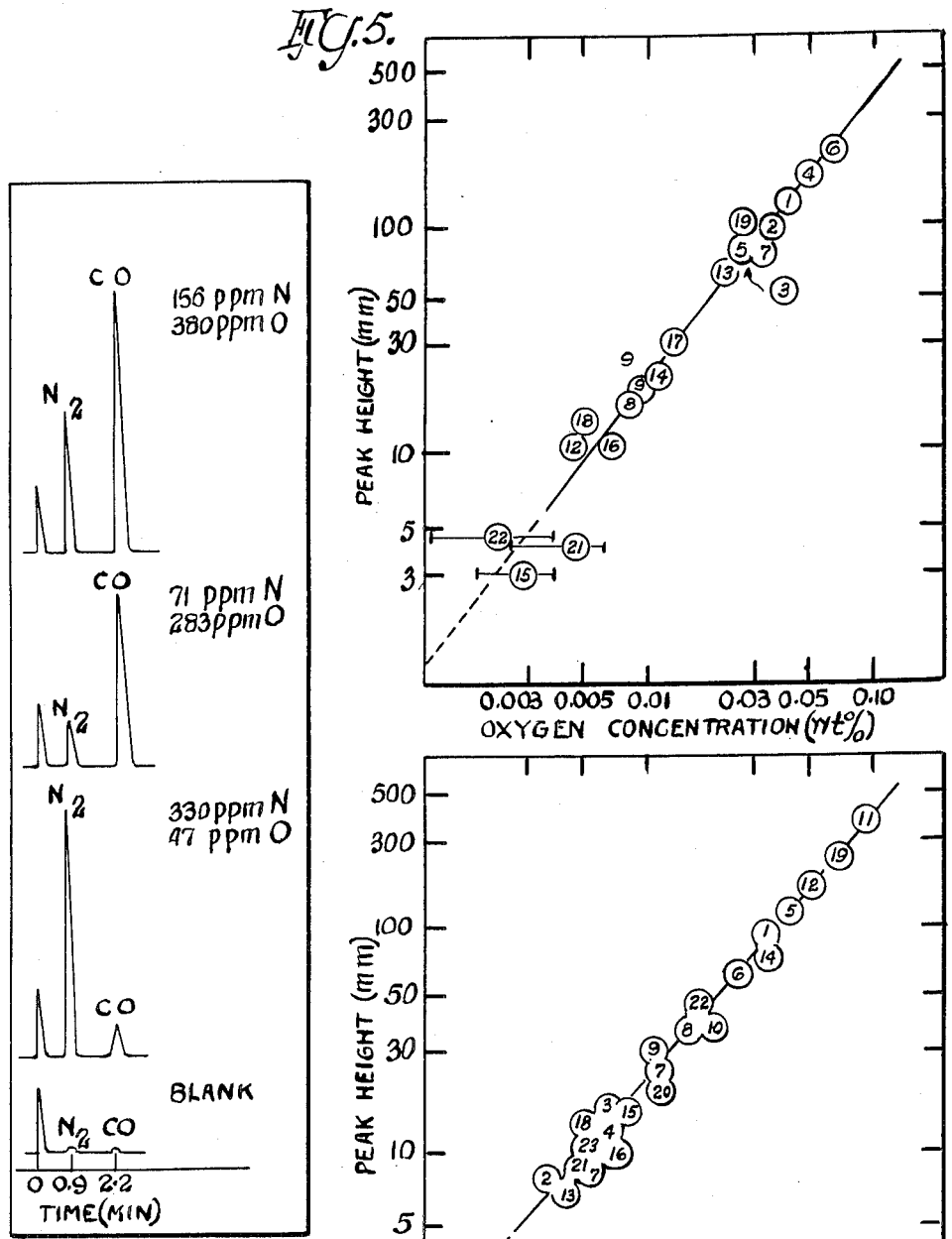

3,251,217
DETERMINATION OF GASES IN METALS
Floyd Monte Evens, Cincinnati, Ohio, and Velmer A. Fassel, Ames, Iowa, assignors to Iowa State University Research Foundation, Inc., Ames, Iowa, a corporation of Iowa
Filed Mar. 5, 1963, Ser. No. 262,941
3 Claims. (Cl. 73—23.1)

The invention described herein was made or conceived in the course of or under a contract with the United States Atomic Energy Commission.

This invention relates to the determination of gases in metals and, more particularly, to a new technique for the determination of gases such as oxygen and nitrogen in metals such as alloy steels.

During the past decade, increasing demands have been placed on the analytical chemist to provide rapid, sensitive and accurate procedures for determining the residual oxygen and nitrogen content of metals. The advent of high purity oxygen steel refining operations has made the "need to know quickly" even greater so that corrective measures can be applied during the production operations. Recent modifications of the vacuum fusion and inert gas fusion techniques have made it possible to reduce the time required for oxygen and nitrogen determinations in a sample down to ten minutes. However, the validity of the nitrogen results obtained with these techniques has been repeatedly questioned.

It is, therefore, an object of the invention to provide a novel method for the determination of the gas constituents of metals and, more particularly, for determining in rapid fashion the oxygen and nitrogen contents of alloy steels. In this connection, we find that the invention is effective to measure the concentration range of 0.003–0.080 weight percent of oxygen or nitrogen with a relative standard deviation less than ±5%, and, equally importantly, for production control operations, a single sample analysis can be concluded in less than five minutes.

Another object of the invention is to provide a method for the simultaneous determination of oxygen and nitrogen in steels by a D.-C. carbon arc, gas chromatographic technique.

A further object of the invention is to provide novel apparatus, in combination, effective for developing rapid and reliable determinations of trace gases in alloy steels.

In one embodiment of the invention, the steel specimen is subjected to a D.-C. carbon arc discharge in a static rare gas atmosphere. The arc is developed between a counter electrode and a carbon or graphite electrode supporting the sample, so that the sample is melted and the interstitial oxygen and nitrogen evolved as carbon monoxide and molecular nitrogen, respectively. An aliquot of the resulting gas mixture is transferred to a gas chromatograph, where a molecular sieve column separates the individual components. A sensitive thermal conductivity cell is employed to detect the carbon monoxide and nitrogen in the effluent stream. Thus, a further object of the invention is to provide a method and means for chromatographically separating the extracted trace gases from a rare atmosphere gas such as helium or argon, and thereafter detecting and measuring the separated gases by thermal conductivity differences, or other sensitive detection techniques.

Other objects and advantages of the invention may be seen in the details of construction and operation set down in this specification.

The invention is explained in conjunction with the accompanying drawing, in which—

FIG. 1 is a schematic representation of apparatus employed in the practice of the invention;

FIG. 2 is an enlarged sectional view of the extracting or vacuum chamber portion of the apparatus of FIG. 1;

FIG. 3 is an enlarged sectional view of the supporting electrode portion of FIG. 2, with a specimen mounted therein;

FIG. 4 is a chart of typical test results;

FIG. 5 is a plot of observed peak heights of oxygen determinations as a function of oxygen concentration; and FIG. 6 is a view similar to FIG. 5 but dealing with nitrogen determinations and concentrations.

Referring now to FIG. 1 of the drawing, the numeral 10 designates generally an extraction chamber, which can be seen in enlarged form in FIG. 2. The chamber 10 is equipped with a connection as at 11 to alternately communicate the interior of the chamber 10 with a source of vacuum 12 (indicated schematically by a box and labeled "Vacuum"). For this purpose, a conduit 13 is equipped with a valve 14.

The chamber 10 also communicates with a source of purified helium (also shown as a box in FIG. 1) designated 15. The helium is introduced into the chamber 10 by means of a conduit 16 equipped with a valve as at 17.

Still further, the chamber 10 is equipped with an outlet as at 18 communicating with a conduit 19 equipped with a valve 20. The conduit 19 leads to a measuring device generally designated 21, as also does a branch line 22 from the source of helium 15, a valve 23 being interposed in the line 22 from the helium source 15 to the measuring device 21.

Important elements in the measuring device 21 include a chromatographic column generally designated 24 and a thermal conductivity cell generally designated 25, both of which are included within a thermal compartment 26 provided as part of the measuring device.

EXTRACTION CHAMBER

The extraction or vacuum chamber 10, has seen in FIG. 2, includes a casing 27 having a top 28 hingedly connected to the casing 27 to provide access to the inside of the chamber. The top 28 carries an electrical terminal 29 which may be Carborundum Company Model 95.0056 silver soldered into a vertical port 30.

A vacuum seal between the top 28 and the casing 27 is achieved by compressing a neoprene O-ring 31 between the two portions 27 and 28, the casing 27 being recessed as at 32 for this purpose.

The casing 10 is equipped with horizontal ports as at 33 and 34, suitably sealed with glass windows 35 and 36 which are compressed against neoprene O-rings 37 and 38 by threaded brass sleeves 39 and 40.

In addition to water cooling cavities 41 and 42 provided in the top 28, copper coils as at 43, 44, 45, 46, 47 and 48 are soldered to the external chamber surface to provide additional cooling.

A stainless steel rotatable platform 49 accommodating eight electrodes is attached to the casing 27 by means of a pin 50, a graphite washer 51 being provided to separate the platform 49 from the bottom wall 52 of the casing 27. It will be seen that a single counter electrode generally designated 53 is provided for each of the plurality of supporting electrodes, only one of which is seen in FIG. 2 and which is designated 54.

As employed in the invention, D.-C. carbon arc discharges in a pure rare gas atmosphere can effect the quantitative liberation of the oxygen and nitrogen content of metals as carbon monoxide and molecular nitrogen at a faster rate than has been achieved in a furnace fusion. Aside from the advantage of excessively rapid liberation of the oxygen and nitrogen content of metals, the D.-C. carbon arc extraction process possesses the additional distinctive features:

(1) Electrode configurations can be employed which assure that the arc discharge rests directly on the molten sample. Under these conditions, the temperature of the anode spot is equal to the boiling-point of the melt, and has been estimated to exceed 3000° C. Thus, carbon reduction reactions or nitride decomposition reactions which may not occur at 2000° C. may proceed with vigor at 3000° C.

(2) The precipitous temperature gradient of approximately 1500° C. over a linear distance of only a few millimeters, causes vigorous convection stirring of the melt. This vigorous stirring action encourages rapid evolution of the gases formed in the melt and is in sharp contrast to the languid reaction medium normally found in furnace fusions.

(3) The arc is a more thermally isolated high temperature source than a furnace. As a consequence, it is easier and faster to outgas the experimental facilities to tolerable blank levels.

With the D.-C. carbon arc extraction technique employed here, under optimal environmental conditions, the residual oxygen and nitrogen content of the melt in equilibrium with the extracted carbon monoxide and molecular nitrogen in a static, inert gas atmosphere, is negligible. Thus, to complete the analysis, it is only necessary to determine the trace carbon monoxide and molecular nitrogen content of a suitable aliquot of the atmosphere in which the extraction is performed.

SAMPLE PREPARATION

Solid samples or specimens S (see FIG. 3) can be cut into cylinders or cubes of appropriate dimension and abraded with a fine steel file to removed surface contamination. Samples in the form of chips may be pressed into ¼" diameter cylinders by a brick briquetting press such as Model No. 52 of Applied Research Laboratories, this being operated at 8000 p.s.i. From the wide variety of specimens tested, it will be apparent that the invention has utility in connection with other metals than steel.

The metal samples can be supported in specially designed graphite electrodes (again see FIG. 3). In this application, we refer at times to the electrodes as being carbon, and in this sense use the latter term generically to include the preferred graphite electrodes. These electrodes form the anode of a D.-C. arc discharge in the rare gas at atmospheric pressure. With properly designed electrodes of this type, the arc discharge quickly melts the metal specimen. The molten sample then dissolves the retaining wall of the electrode and forms a globule supported on the floor of the electrode. The dissolved carbon comes into intimate contact with the dissolved oxides, nitrides and hydrides, causing chemical reduction and thermal decomposition reactions. Simultaneously, a saturated solution of carbon in the metal is formed, which reduces the volatility of the metal.

As seen in FIG. 3, the supporting electrode 54 includes a generally cylindrical base 55 which, in one embodiment of the invention, may have a diameter of 7.9 millimeters and a height of 6.4 mm. The base is integrally connected to the specimen-supporting cup 56 by means of a post portion 57. The post portion 57, in the illustrated embodiment, has a height of 6.4 mm. and a diameter of 1.6 mm. The cup 56 may have a height of 4.8 mm. and a diameter of 7.9 mm. Providing a specimen-receiving portion is a cavity 58 which has a diameter of 6.3 mm. concentric with the periphery of the cylindrical cup 56. The cavity 58 is further characterized by a conical axial depression, with the sides of the conical portion of the depression being arranged at 30° to the horizontal.

Spectroscopic studies show that the rate at which carbon monoxide and molecular nitrogen is extracted and the quantitativeness of the extraction are dependent upon the environmental conditions in the electrode receptacle 54. The illustrated embodiment of the supporting electrode or electrode receptacle provides the following benefits:

(a) Rapid carbon dissolution from the receptacle walls so that the carbon reduction reaction proceeds at a maximal rate;

(b) Dissolution of an optimal amount of carbon, since an excess tends to form a viscous globule which may trap the gases formed;

(c) Complete dissolution of receptacle walls so that the arc rests on the globule; and (d) Minimal sample volatilization in order to reduce gettering possibilities.

The electrode geometry shown in FIG. 3 satisfies these four conditions to a high degree when one gram samples are arced in a helium atmosphere at a pressure of 700 torr.

OUTGASSING OPERATION

The desired number of supporting electrodes 54 are placed in positions on the rotary table 49 and the loading port 33 is sealed, i.e. with the window-equipped sleeves 39. With one of the supporting electrodes in position opposite the counter electrode 53 and with 400 mm. pressure of helium, a 30 ampere arc discharge is initiated. The helium pressure is then reduced quickly to approximately 25–50 mm., at which pressure the arc is continued for about 15 seconds. Without terminating the arc discharge, the next electrode is moved into position and arced for 15 seconds under the initial 25–50 mm. helium pressure. The arc discharge on its own accord readily transfers from one supporting electrode to another as the electrodes are moved in and out of position. After each electrode has been arced in this manner, the chamber is evacuated, a fresh charge of helium is admitted, and the entire procedure is repeated. During these operations, certain of the cavities 41–48 may be water cooled. After the outgassing operations are completed, the port closure assembly 39 is opened, while the chamber is flushed with helium at flow rates of 2–3 liters per minute. Thereafter, the specimens or samples are loaded, the port closure is sealed, and the chamber is evacuated to a pressure of at least $10^{-4}$ mm. Hg. The samples are then excited by means of establishing the D.-C. arc.

The voltage drop across the arc is about 60–70 volts maximum. It is therefore possible to use any D.-C. source providing 110 or 220 volts D.-C. Table I appearing hereinafter shows that a current of 15 amperes is used for the helium atmosphere determination.

In the illustration given, the extraction chamber 10 is attached to the gas chromatograph 24, which was a Beckman Instruments, Inc. Model GC–2a, the connections being made through appropriate combinations of high vacuum coupling (Central Scientific Co., Model 94235-3), Swagelock tube fitting (Crawford Fitting Co., Models 400-6-3-316 and 400-7-2-316), toggle valve (Hoke, Inc.) and ¼" O.D. annealed copper tubing. A single helium gas cylinder may be used to supply both the chromatograph 24 and the D.-C. carbon arc extraction chamber 10.

Also employed in connection with the measuring device 21 is a sampling valve 59 coupled to a filter and capillary orifice unit 60 by means of a conduit 61. The sampling valve 59 is also coupled to the conduit 19 and further, by means of conduit 62, to the molecular sieve chromatographic column 24.

A second filter and capillary orifice unit is interconnected between the conduit 22 and the reference side 25a of the thermal conductivity cell 25, the column 24 being connected to the sensing side 25b of the cell 25. In each case, the cell is equipped with suitable exhaust lines as at 25c. Regulating the pressure of the helium in conduit 22 is a pressure regulator 64, and the conduit 22 may also be equipped with a gauge 65.

OPERATION

Initially, the chromatographic column 24 is stabilized with helium flowing through valve 23 into the internal components of the measuring device 21 as indicated by the arrows applied to FIG. 1. Valve 17 is closed during this operation. During the stabilization period, the desired number of sample electrodes 54 are placed in positions on the rotary electrode platform 49 and outgassed as described above.

Valves 14 and 20 are then opened to evacuate the chamber 10 and one loop 59a of the gas sampling valve. Valve 17 is closed during the evacuation. When the internal pressure of the chamber 10 and the sampling loop 59a is reduced to less than $10^{-4}$ torr, valves 14 and 20 are closed and valve 17 is opened to admit a measured quantity of helium into the chamber 10. A variable constriction 66 placed adjacent valve 17 and on the helium supply side, may be employed to control the rate of gas flow into the evacuated chamber. This arrangement prevents chromatogram base line shift, which results from an instantaneous decrease of helium forepressure at the front of the capillary orifices 60 and 63.

After the arc extraction operation, valve 20 is opened to expand a 5 ml. aliquot of the gas in the chamber 10 into the evacuated sampling loop 59a. A rapid 90° rotation of the sampling valve handle 59b makes it possible for the carrier gas stream to sweep the sample onto the column 24. After rotation of the gas sampling valve handle 59b, the alternate sample loop 59c is placed in position for repetition of the evacuation sequence described above. Within experimental error, both the sampling loops 59a and 59c are identical in volume, thus allowing equivalent quantities of gas to be transferred from the extraction chamber 10. Thus, the extraction cycle of a new sample can be conducted while the chromatographic analysis of the preceding sample is completed. A typical analysis is completed by observing recorded deflections such as with an E. H. Sargent Co. Potentiometer Recorder, Model SR, as the individual components pass through the thermal conductivity detecting cell.

A factorial study on the rates of evolution of the carbon monoxide and nitrogen and the time required for uniform mixing of the extracted gases in the chamber 10 reveal that a steady state condition is achieved for most alloys during a 60 second extraction cycle. A few high alloy steel samples require 90 second extraction periods to produce maximal gas chromatographic peak heights for nitrogen, indicating that the extraction of this impurity proceeds at a slower rate for some steel compositions. In order to accommodate as many types into the analytical calibrations, a standard 90 second extraction cycle is employed. Since continuation of the arc discharge beyond the time required to achieve a steady state condition leads to significant loss of some of the extracted gases, precise timing of the arcing cycle is indicated.

ANALYTICAL CALIBRATIONS AND DETERMINATIONS

The pertinent experimental conditions employed are summarized in Table I. It is appropriate to note that the 60-second gas cooling period after extraction leads to a substantial improvement in precision. When synthetic gas mixtures are arced in the chamber 10 and transferred to the gas chromatograph 24 immediately after termination of the arc discharge, the peak heights show a coefficient of variation of ±5 percent. This variation can be reduced to less than ±2 percent by allowing the gases to cool for 60 seconds prior to admitting them into the gas chromatograph.

*Table I.—Combined arc extraction and gas chromatographic operating parameters*

(A) Gas extraction:
  (1) Sample size _____ 1.0±0.1 g. (measured concentrations were normalized to a 1.0 g. basis by multiplication with the appropriate conversion factor).
  (2) Supporting atmosphere ____ He, at pressure of 680 torr, reproduced to ±1 percent.
  (3) Type of electrodes _____ (United Carbon Co., Spectro-Tech.)
    Anode _____ Undercut graphite electrode as shown in FIG. 3.
    Cathode _____ 8 mm. diameter conical tipped graphite rod, 22 mm. long.
  (4) Arcing current _____ 15 amp.
  (5) Arcing interval _____ 90 sec.
  (6) Gas cooling period _____ 60 sec.
  (7) Volume of gas aliquot transferred to chromatograph __ 5 cc., reproduced to ±1 percent.

(B) Gas chromatograph determination:
  (1) Helium forepressure _____ 25 lb./in.²
  (2) Carrier gas flow rate at column exit _____ 72 cc./min.
  (3) Column packing _____ Molecular sieve 5A.
  (4) Column length _____ 3 ft.
  (5) Column temperature _____ 70° C.
  (6) Detector output attenuation _____ 5×(⅕ of the total output).
  (7) Recorder chart speed _____ ½ in./min.
  (8) Recorder cap span _____ 1 mv. (full scale).
  (9) Recorder response _____ 1 sec. (full scale).

Typical chromatograms obtained under the experimental conditions outlined in Table I are illustrated in FIG. 4. The deflection shown at zero time is a false peak produced by the interruption of the carrier gas flow rate when the gas sampling valve is rotated. This deflection serves as a convenient time reference point for chromatographic recording. Since reproducible and symmetrical elution bands are obtained, the simple expedient of measuring the peak heights is used.

For quantitive calibrations, it may seem sufficient, at first glance, to introduce into the chamber measured volumes of helium gas containing accurately determined nitrogen and carbon monoxide impurities. This simple approach neglects the fact that the carbon arc discharge converts a portion of the extracted carbon monoxide and nitrogen into other chemical species. There is, first of all, the well known reaction between carbon and nitrogen to form cyanogen, as evidenced by the emission of cyanogen band spectra in the arc discharge. Also, some of the evolved molecules are dissociated into the constituent atoms, i.e., O and N. Since a small amount of metal vapor is also present in the arc column during the evolution of carbon monoxide and nitrogen, the reaction of these gases with metal atoms is another likely process. Thus, some loss of the evolved gases is expected. The degree of loss can be approximately ascertained by introducing helium containing carbon monoxide and nitrogen impurities into the extraction chamber and noting the peak heights obtained before and after conducting an arc discharge in the mixture. A typical set of data is shown in Table II.

Table II.—*Typical loss of carbon monoxide and nitrogen during arcing process*

|  | Gas chromatographic peak heights (mm.) | | |
|---|---|---|---|
|  | Before arcing | After arcing | |
|  |  | Graphite anode | Steel globule in anode |
| CO | 114 | 106 | 92 |
| N₂ | 329 | 264 | 309 |

Although it is possible, in principle, to determine empirical corrections for these losses, a more definitive experimental approach is to observe peak heights for a set of steel samples of widely ranging composition. If the oxygen and nitrogen content of these samples is accurately known, an unequivocal evaluation can then be made on the reproducibility of loss during the extraction and the potential scope of application of this technique to steel types of different chemical constitution. The set of steel standards and samples used for this purpose are shown in Table III.

R. H., in "Symposium on Determination of Gases in Metals," American Soc. for Testing Materials, Tech. Publ. No. 222, pp. 3–13, 1962.

The concentration values listed in Table III for these standards were obtained on these rod sections employed for calibration purposes. The average peak heights obtained from replicate determination on all of the samples are also summarized in Table III. Since the operating blank represented considerably less than 1 mm. peak deflection, no correction for its contribution to the overall peak height was made. Plots of the observed peak heights as a function of concentration are shown in FIGS. 5 and 6. Within experimental error, all of the data for nitrogen and all of the points for oxygen concentrations greater than 0.005 percent yield congruent analytical curves. For oxygen concentrations less than 0.005 percent, considerable uncertainty exists in the actual oxygen content of the samples. The concordance of the data plotted in FIGS. 5 and 6 suggests that a single analytical curve will be applicable to most ferrous base metals and alloys. It is worth noting that the two silicon steel samples (Nos. 22 and 23) correspond to cooperative samples Nos. 2 and 3 in the study by Karp, et al. (Journal Iron & Steel Institute 200, 1032, 1962). Our nitrogen results obtained by the modified vacuum fusion procedure agree with the caustic fusion values reported by Karp, et al., and both samples produce concordant experimental points in FIG. 6.

The precision data summarized in Table IV were obtained from single measurements repeated on ten different days.

Table III.—*Steel samples of known oxygen and nitrogen content*

| Sample | Composition | Concentration (weight percent) | | Peak heights (mm.) | |
|---|---|---|---|---|---|
|  |  | Nitrogen | Oxygen | Nitrogen | Oxygen |
| 1. NBS 8h | Bessemer steel (chips), 0.5% Mn | 0.017 | 0.038 | 54.0 | 98.5 |
| 2. NBS 152 | Basic Open Hearth (chips), 0.8% Mn, 0.2% Si | 0.0038 | 0.031 | 9.5 | 76.0 |
| 3. NBS 111b | Ni-Mo Steel (SAE 4620) (chips), 1.8% Ni, 0.3% Mo, 0.3% Si, 0.7% Mn | 0.0050 | 0.028 | 13.5 | 55.0 |
| 4. NBS 122c | Cast iron (chips), 0.5% Mn, 0.6% Si | 0.0040 | 0.056 | 12.0 | 170 |
| 5. NBS 101d | 18% Cr, 9% Ni (chips), 0.7% Mn, 0.5% Si | 0.024 | 0.027 | 79.5 | 68 |
| 6. NBS 129a | Bessemer (SAE X1112) (chips), 0.8% Mn, 0.3% S | 0.014 | 0.069 | 40.5 | 215 |
| 7. NBS 461 | Low alloy, 0.4% Mn, 0.3% Mo, 1.7% Ni | 0.0071 | 0.028 | 17.5 | 72.5 |
| 8. NBS 462 | Low alloy, 0.9% Mn, 0.3% Si, 0.7% Ni, 0.7% Cr | 0.0092 | 0.0082 | 25.5 | 16.5 |
| 9. NBS 463 | Low alloy, 1.15% Mn, 0.4% Si, 0.4% Ni, 0.15% Ta, 0.4% Cu, 0.2% Zr, 0.1% Mo | 0.0072 | 0.0095 | 19.5 | 19.5 |
| 10. Type 321 | 18% Cr, 9% Ni, 2% Mn, 1.0% Si, 0.3% Ti | 0.010 | <0.001 | 24.5 |  |
| 11. Type 347 | 18% Cr, 7% Ni, 2% Mn, 1% Nb | 0.084 | <0.001 | 309 |  |
| 12. Type 430 | 16% Cr, 1.0% Mn, 1.0% Si | 0.032 | 0.0052 | 105.0 | 11.5 |
| 13. NBS 1040 | Low carbon, 0.3% Mn | 0.0037 | 0.023 | 8.2 | 59.5 |
| 14. NBS 1042 | Bessemer, 0.7% Mn | 0.016 | 0.011 | 47.0 | 22.0 |
| 15. NBS 1043 | Low carbon, 0.6% Mn | 0.0050 | 0.0030 | 12.5 | 3.0 |
| 16. NBS 1045 | Medium carbon, 0.5% Mn | 0.0050 | 0.0070 | 10.0 | 11.0 |
| 17. NBS 1047 | Low carbon, 0.4% Mn | 0.0040 | 0.014 | 9.2 | 30.5 |
| 18. E | Low alloy | 0.0043 | 0.0050 | 12.2 | 12.0 |
| 19. Type 302 | 18% Cr, 9% Ni, 0.7% Mn | 0.064 | 0.028 | 242 | 75.5 |
| 20. Nickel steel. | 2.8% Ni, 0.7% Mn, 0.3% Si, 0.9% Cr, 0.2% V, 0.2% Cu. | 0.0072 | <0.001 | 15.5 |  |
| 21. Nickel steel. | 3.0% Ni, 0.7% Mn, 0.6% Mo, 0.8% Cr, 0.2% V | 0.0044 | 0.0050 | 9.5 | 4.5 |
| 22. Silicon steel. | 2.6% Si | 0.0090 | 0.0022 | 28.5 | 5.0 |
| 23. Silicon steel. | 3.4% Si | 0.0046 | <0.001 | 11.5 |  |

NBS=National Bureau of Standards.

The oxygen and nitrogen values listed in Table III are the average results of replicate determinations by a modified platinum bath, vacuum fusion procedure. This procedure is accurate for the determination of oxygen and nitrogen contents greater than 0.005 percent. For several samples, National Bureau of Standards certified values were available, except for the 1040 series of standards. Serious heterogeneity in the oxygen content of these specimens has already been reported and our measurements have confirmed these findings, Guernsey, D. L. Franklin, Table IV.—*Precision data*

| Sample | Concentration (wt. percent) | | No. of determinations | Relative standard deviation (percent) | |
|---|---|---|---|---|---|
|  | Oxygen | Nitrogen |  | Oxygen | Nitrogen |
| 8h | 0.037 | 0.017 | 10 | 2.6 | 2.7 |
| 462 | 0.0085 | 0.0089 | 10 | 5.5 | 2.9 |

This invention provides a means for the determining of the oxygen and nitrogen concentration of steels with sufficient rapidity for production control operations. Single samples may be added to the outgassed electrode and chamber system through the side port. If the chamber is flushed with helium at a flow rate of 2 to 3 liters/min. during the loading operation, no subsequent outgassing is required. In this way the total time required for determining both oxygen and nitrogen on a single sample is less than 5 minutes. Several modifications in the operating conditions should permit even more rapid analyses. FIG. 6 shows that a three-foot column provides more resolution in the resolution peaks than is actually required. Thus, shorter column lengths should make it possible to subtract as much as a minute from the elapsed time. If a relative standard deviation of ±5 to 10 percent can be tolerated in the analytical results, the 60 second gas-cooling period can be eliminated. These two modifications should make it possible to obtain analytical results in approximately 3 minutes.

The ultimate sensitivity of this technique can be extend considerably. Only one-fifth of the signal generated by the chromatographic detector was used in the calibration experiments, consequently a fivefold increase in sensitivity is readily available by operating the instrument at its maximal output. The noise level under these conditions is less than ±0.3 mm. and therefore does not present a serious interference. Another 100-fold increase in sensitivity can, in principle, be achieved if all of the extracted gases are subjected to chromatographic examination.

While the foregoing specification, a detailed description of an embodiment of the invention has been set down for the purpose of illustration thereof, many variations in the details herein given may be made by those skilled in the art without departing from the spirit and scope of the invention.

We claim:

1. A method of determining trace gases in metals, the steps of: subjecting a metal specimen to a direct current carbon arc discharge while said specimen is in a chamber having an atmosphere therein of an inert gas, said atmosphere being less than about one atmosphere and being constituted substantially of helium, flowing an aliquot of the gas from said chamber through a chromatographic measuring device to separate the gases and detecting the separated gases, said specimen being subjected to cooling for about 60 seconds following the impression of said direct current.

2. In apparatus for the determination of quantities of trace gas in metal, a housing equipped with a plurality of ports, means coupled to said ports for evacuating said housing of ambient gas, introducing an inert gas thereinto and for removing a stream of said inert gas and other gas extracted from a metal specimen positioned within said housing, and means for quantitatively determining the amount of extracted gas, said quantitatively determining means including a gas chromatograph coupled to said housing and a thermal conductivity cell coupled to said gas chromatograph, said housing being equipped with a pair of carbon electrodes, and means for impressing a voltage of the order of 80–220 volts direct current across said electrodes, said housing also being equipped with means for cooling said gas for about 60 seconds prior to introducing said extracted gas into said gas chromatograph.

3. The structure of claim 2 in which said electrodes include a supporting electrode having a cup-like portion for supporting a metal specimen and a counter electrode having a generally conical tip to develop an arc focused on said specimen.

References Cited by the Examiner

UNITED STATES PATENTS

| | | | |
|---|---|---|---|
| 2,252,508 | 8/1941 | Hoff | 219—121 X |
| 2,861,450 | 11/1958 | Ransley | 73—19 |
| 2,971,369 | 2/1961 | Danaczko et al. | 73—19 |
| 2,991,684 | 7/1961 | Wever et al. | 73—19 |
| 3,057,692 | 10/1962 | Van Kirk et al. | 73—23.1 |
| 3,176,500 | 4/1965 | Coe | 73—19 |

RICHARD C. QUEISSER, *Primary Examiner.*

J. FISHER, *Examiner.*